United States Patent Office 2,914,476
Patented Nov. 24, 1959

2,914,476

THICKENED PETROLEUM LIQUID ESPECIALLY FOR TREATING WELLS

Edwin N. Alderman, Elmer I. Spearman, and Caleb M. Stout, Tulsa, Okla., assignors to The Dow Chemical Company, Midland, Mich., a corporation of Delaware No Drawing. Application April 30, 1957
Serial No. 655,955

5 Claims. (Cl. 252—8.55)

The invention relates to a liquid composition having a base of petroleum oil, the composition being useful as a vehicle for carrying a particulate solid in suspension into the producing formation of a well as in fracturing wells to stimulate production of oil or gas.

Heretofore in preparing liquids for use in well fracturing operations employing a propping agent in the form of a particulated solid, such as sand, it has been proposed, as in U.S. Patent 2,667,457, to convert crude petroleum oil, for example, into a fracturing gel by reacting together in the oil about 4 to about 10 weight percent of an aliphatic organic acid having from 16 to 20 carbon atoms and a sufficient quantity of a base to neutralize the acid. The gels so-prepared are said to possess a sufficiently high viscosity to maintain in suspension the particulate propping material. It is to be inferred from the disclosure of the said patent that the gels are useful for fracturing wells as by the method disclosed in U.S. Patent 2,596,845. Nevertheless in carrying out these teachings, we have encountered difficulties which limit their usefulness. One of these is that an inordinarily large amount of these gelling materials is required to obtain the desired high viscosity and sand carrying ability. Another is the high cost of providing such gels. Still another is the need for a gel breaker to facilitate the removal of the gel from the earth formation after fracturing so that the flow of oil or gas to the well will not be hindered by the gel.

Accordingly, it is the principal object of the invention to provide an improved gelled petroleum oil suitable for use in well fracturing operations, for example, without the need for the injection of a gel breaker. Other objects and advantages will appear as the description of the invention proceeds.

The invention is predicated upon the discovery that by reacting, in admixture with petroleum oil, a mixture of tall oil and at least one of the aliphatic organic acids, octanoic, hexanoic, and decanoic, and an alkali metal hydroxide, the latter being at least in approximately the proportions required to neutralize the acid including that of the tall oil, desirable gellation is obtained quickly with concentrations of tall oil which need not exceed 2 or 3 percent by weight and the amount of the acid added to the tall oil need be but a fraction of the amount of tall oil, for example, from about 10 to 25 percent by weight, about 13.5 percent being preferred. The small quantity of tall oil required when at least one of the aforementioned aliphatic acids is included makes the method economically feasible and no gel breaker need be injected into the earth formation following a fracturing treatment as the gel or thickened oil so-obtained automatically thins on remaining in contact with the crude oil present in oil and gas producing earth formations.

Petroleum oils so-treated have a low filtrate rate and a large capacity to suspend the particulated solids, such as those used in well fracturing operations, particularly sand. To be effective in carrying a particulated solid in suspension, as in well fracturing operations, the falling rate of the solid particles in the vehicle, gelled or thickened in accordance with the invention, should not exceed one foot per minute at 80° F. Oils thickened according to the invention easily meet this requirement.

The following groups of tests are illustrative of the improved properties exhibited by a petroleum oil thickened according to the invention.

In one group of these tests to 100 parts of kerosense having a viscosity of 2 centipoises at 80° F., 1 part of tall oil and mixtures of the tall oil with one of the aforementioned acids were added and in each instance neutralized with an excess of 30 percent aqueous caustic soda solution by stirring the ingredients together. As a result, the kerosene was thickened as shown by viscosity measurements. The pertinent data of these tests are set forth in Table I.

Table I

| Test No. | 1 part of agent named below added per 100 parts of kerosene | Resulting viscosity at 80° F. after neutralization with caustic soda solution in situ in centipoises at 80° F. |
|---|---|---|
| 1 | Tall oil [1] alone | 43 |
| 2 | Mixture of 9 parts of tall oil and 1 part of octanoic acid. | 152 |
| 3 | Mixture of 8.5 parts of tall oil and 1.5 parts of octanoic acid. | 202 |
| 4 | Mixture of 8.0 parts of tall oil and 2.0 parts of octanoic acid. | 200 |
| 5 | Mixture of 8.5 parts of tall oil and 1.5 parts of decanoic acid. | 146 |
| 6 | Mixture of 8.5 parts of tall oil and 1.5 parts of hexanoic acid. | 76 |

[1] Tall oil used throughout was Armour Chemical Co. Neofat 42-06 having the following composition: rosin acid 6%, oleic acid, 50%, linoleic acid 40%, linolenic acid and unsaponifiable 4%.

Another advantage resulting from the inclusion of one of the aforementioned acids with the tall oil, on being neutralized in situ in a petroleum oil, is that the gelled oil so-obtained exhibits a greatly lowered fluid loss or filtrate rate as measured by employing the filtration apparatus and process described in American Petroleum Institute, Code 29, second edition, July 1942, "Standard Field Procedure for Testing Drilling Fluids" (tentative), section V. The group of comparative tests set forth in Table II are illustrative of this using kerosene as the oil being thickened and the amount of the thickening agent being 1 percent of the kerosene weight.

Table II

| Test No. | Agent added to kerosene | Fluid loss by API Code 29 at 80° F.[1] |
|---|---|---|
| 7 | Tall oil (blank) | 400 ml. in 16½ minutes. |
| 8 | Tall oil 8.5 parts and octanoic acid 1.5 parts. | 38 ml. in 30 minutes. |

[1] After neutralization of the agent in situ with 1.5 percent of NaOH in a 30 percent water solution based on kerosene weight.

The ability of a petroleum oil thickened, in accordance with the invention to suspend sand, is illustrated in the group of tests in Table III. In these tests, kerosene was thickened with various amounts of an acid mixture of 8.5 parts of tall oil and 1.5 parts of octanoic acid and then the rate at which sand (Flintshot Ottawa sand) of 20 to 40 mesh standard sieve size, descended in a column of the so-thickened oil was measured.

Table III

| Test No. | Percent[1] of acid mixture added | Percent[1] of NaOH as 30% caustic soda solution for neutralization | Resulting viscosity in cps. at 80° F. | Sand falling rate, feet per minute at 80° F. |
|---|---|---|---|---|
| 9 | 1.0 | 1.5 | 202 | less than 0.1 |
| 10 | 0.75 | 1.2 | 88 | Do |
| 11 | 0.50 | 0.75 | 54 | 2 |

[1] Based upon weight of kerosene.

Of these tests, No. 11 is to be regarded as a blank for comparison as it is manifest that at an acid concentration of somewhat below 0.75 percent, e.g. 0.5 percent as in test 11, the viscosity is not sufficiently increased to reduce the sand falling rate to the required aforesaid minimum of 1 foot per minute (for 20–40 mesh sand).

While the method of thickening herein described has been exemplified more especially with kerosene, other petroleum oils may be similarly treated to increase their viscosity and sand carrying capacity, and to reduce the fluid loss. In Table IV is a group of tests illustrative of this using various crude petroleum oils identified as to source. The oils were thickened by neutralizing in situ, 1.5 percent of NaOH in 30 percent aqueous solution, and 1 percent (based on the weight of the oil) of a mixture of 8.5 parts of tall oil and 1.5 parts of octanoic acid.

Table IV

| Formation Oil | A.P.I. Gravity at 60° F. | Viscosity,[1] Brookfield No. 2 Spindle 60 r.p.m. (cps.) | Sandfalling rate[1] (ft./min.) | Fluid loss,[1] API Code 29 | Viscosity,[2] Brookfield No. 2 Spindle, 60 r.p.m. (cps.) | Sandfalling rate[2] (ft./min.) | Fluid loss,[2] API Code 29 |
|---|---|---|---|---|---|---|---|
| Hart | 66.8 | 20 | 5.8 | 39 ml./30 min | 138 | less than 0.1 | 18 ml./30 min. |
| Springer | 65.8 | 32 | 5.7 | 51 ml./30 min | 142 | do | 17 ml./30 min. |
| Strawn | 47.2 | 31 | 4.4 | 144 ml./30 min | 142 | do | 35 ml./30 min. |
| Oil Creek | 45.6 | 38 | 6.9 | 29 ml./30 min | 96 | do | 22 ml./30 min. |
| N. J. Beagle | 39.8 | 24 | 2.7 | 261 ml./30 min | 117 | do | 197 ml./30 min. |
| Gibson | 37.0 | 32 | 4.6 | 214 ml./30 min | 168 | do | 40 ml./30 min. |

[1] Before thickening.
[2] After thickening.

In general the neutralization required is effected by agitating the reagents, that is the tall oil and aliphatic organic acid named and alkali metal hydroxide, in the oil to be thickened preferably at temperature of 60° to 85° F., although other temperatures may be used. Sodium hydroxide is the preferred alkali metal hydroxide, although other alkali metal hydroxides, e.g. KOH, may be used. A preferred way to thicken the oil is to disperse the tall oil and aliphatic organic acid in the petroleum oil first and then disperse the alkali dissolved in water in the resulting dispersion. Agitation is preferably continued for 10 to 20 minutes to ensure substantial completion of the neutraliztaion reaction. The amount of alkali used should be at least about that required to neutralize the acids involved as already mentioned. However, the optimum amount to use is approximately as much as three times that required for neutralization. The alkali is best used in aqueous solution as in a concentration of 30 to 50 percent. Various amounts of particulate material may be suspended in the oil thickened according to the invention, thereby providing a desirable well fracturing fluid. Optimum amounts of particulate material are from 1.5 to 3 pounds per gallon of the gelled oil, although other amounts may be used, e.g. from 0.5 to 6 pounds per gallon. It is to be understood that other aliphatic straight chain carboxylic acids may be used having chain lengths in the range of 6 to 10 carbon atoms.

We claim:

1. The method of increasing the viscosity of a petroleum liquid which comprises reacting together in admixture with the petroleum liquid a mixture of acids, said mixture consisting of tall oil and a straight chain aliphatic organic acid having from six to ten carbon atoms in the chain, and a sufficient quantity of an alkali metal hydroxide to at least approximately neutralize the acids of the said mixture, the amount of the aliphatic organic acid being from 10 to 25 percent of that of the tall oil by weight and the amount of the mixture of acids being from 0.75 to 3 percent of the weight of the petroleum liquid.

2. The method according to claim 1 in which the aliphatic acid is hexanoic.

3. The method according to claim 1 in which the aliphatic acid is decanoic.

4. The method according to claim 1 in which the aliphatic acid is octanoic.

5. The method according to claim 1 which includes the step of adding to the petroleum liquid per gallon therof from 0.5 to 6 pounds of particulate material such as sand.

References Cited in the file of this patent
UNITED STATES PATENTS

| 2,618,596 | Minich et al. | Nov. 18, 1952 |
| 2,667,457 | McChrystal et al. | Jan. 26, 1954 |
| 2,687,175 | Johnson | Aug. 24, 1954 |
| 2,794,779 | Cardwell et al. | June 4, 1957 |